(12) United States Patent
Sakurai et al.

(10) Patent No.: US 11,107,632 B2
(45) Date of Patent: Aug. 31, 2021

(54) MULTILAYER CERAMIC ELECTRONIC COMPONENT

(71) Applicant: TDK CORPORATION, Tokyo (JP)

(72) Inventors: Toshio Sakurai, Tokyo (JP); Hirobumi Tanaka, Tokyo (JP); Keisuke Okai, Tokyo (JP); Daisuke Iwanaga, Tokyo (JP); Hisashi Nakata, Tokyo (JP); Tomoya Sihbasaki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 19 days.

(21) Appl. No.: 16/520,741

(22) Filed: Jul. 24, 2019

(65) Prior Publication Data

US 2020/0035417 A1 Jan. 30, 2020

(30) Foreign Application Priority Data

Jul. 24, 2018 (JP) .............................. JP2018-138152
May 29, 2019 (JP) .............................. JP2019-100193

(51) Int. Cl.
*H01G 4/232* (2006.01)
*H01G 4/30* (2006.01)
*H01G 4/258* (2006.01)

(52) U.S. Cl.
CPC ............ *H01G 4/232* (2013.01); *H01G 4/258* (2013.01); *H01G 4/30* (2013.01)

(58) Field of Classification Search
CPC .......... H01G 4/232; H01G 4/30; H01G 4/258; H01G 2/06
See application file for complete search history.

(56) References Cited

U.S. PATENT DOCUMENTS

| | | |
|---|---|---|
| 2012/0019981 A1 | 1/2012 | Yoshida |
| 2012/0236461 A1 | 9/2012 | Yamamoto et al. |
| 2017/0278634 A1 | 9/2017 | Kato |
| 2017/0309389 A1* | 10/2017 | Sato ...................... H01F 41/041 |
| 2019/0287720 A1* | 9/2019 | Mori ....................... H01G 4/228 |
| 2020/0152382 A1* | 5/2020 | Sakurai .................. H01G 4/232 |
| 2020/0161051 A1* | 5/2020 | Tanaka ................... H01G 4/005 |

FOREIGN PATENT DOCUMENTS

| | | | | |
|---|---|---|---|---|
| JP | 2007-266034 A | | 10/2007 | |
| JP | 2010147098 A | * | 7/2010 | |
| JP | 2012044149 A | * | 3/2012 | ............. H01G 4/232 |
| JP | 2012-209540 A | | 10/2012 | |
| JP | 2017-028254 A | | 2/2017 | |
| JP | 2017-175037 A | | 9/2017 | |

* cited by examiner

*Primary Examiner* — Nathan Milakovich
(74) *Attorney, Agent, or Firm* — Oliff PLC

(57) ABSTRACT

A multilayer ceramic electronic component includes an element body and a terminal electrode. The element body includes internal electrode layers and insulation layers alternately laminated in a lamination direction. The terminal electrode is formed on an outer surface of the element body to be contacted and connected with the internal electrode layers. The terminal electrode includes an end-side electrode part and an upper-side electrode part. The end-side electrode part covers a leading end of the element body where the internal electrode layers are led. The upper-side electrode part is formed on a part of an upper surface of the element body and continues to the end-side electrode part. The terminal electrode is not substantially formed on a lower surface of the element body located on the other side of the upper surface along the lamination direction.

10 Claims, 10 Drawing Sheets

MULTILAYER CERAMIC ELECTRONIC COMPONENT

BACKGROUND OF THE INVENTION

The present invention relates to a multilayer ceramic electronic component used as, for example, a multilayer ceramic capacitor and specifically relates to a multilayer ceramic electronic component capable of being thin.

For example, as shown in Patent Document 1, it is normal for conventional multilayer ceramic capacitors that terminal electrodes are arranged on both ends of an element body in its longitudinal direction, and that each of the terminal electrodes includes an end-side electrode part of the element body and cover electrode parts covering upper and lower surfaces of the element body.

Base electrodes of the terminal electrodes are formed by immersing the ends of the element body into a solution containing conductive particles. In the immersion, multiple element bodies are respectively put into multiple holding holes formed on a holding plate, and ends of the element bodies are immersed into the solution per each side. After that, a plating film is formed on the base electrodes as necessary, and the terminal electrodes are obtained.

In any case, when the terminal electrodes are formed on the element body, the base electrodes and the plating film are hard to be formed if the element body is not thick. That is, when the element body is thin, it easily gets broken in holding the element body by the holding holes of the holding plate. In addition, when the element body is thin, it easily gets broken in plating. In conventional multilayer ceramic capacitors, it is thereby hard to thin the element bodies and achieve a low profile of the multilayer ceramic capacitors.

Patent Document 1: JP201728254 (A)

BRIEF SUMMARY OF INVENTION

The present invention has been achieved under such circumstances. It is an object of the invention to provide a multilayer ceramic electronic component capable of low profile, such as multilayer ceramic capacitors.

To achieve the above object, a multilayer ceramic electronic component according to a first aspect of the present invention includes:
an element body including internal electrode layers and insulation layers alternately laminated in a lamination direction; and
a terminal electrode formed on an outer surface of the element body to be contacted and connected with the internal electrode layers,
wherein the terminal electrode includes:
an end-side electrode part covering a leading end of the element body where the internal electrode layers are led; and
an upper-side electrode part formed on a part of an upper surface of the element body and continuing to the end-side electrode part, and
the terminal electrode is not substantially formed on a lower surface of the element body located on the other side of the upper surface along the lamination direction.

A multilayer ceramic electronic component according to a second aspect of the present invention includes:
an element body including internal electrode layers and insulation layers alternately laminated in a lamination direction; and
a terminal electrode formed on an outer surface of the element body to be contacted and connected with the internal electrode layers,
wherein the terminal electrode includes:
an end-side electrode part covering a leading end of the element body where the internal electrode layers are led; and
an upper-side electrode part formed on a part of an upper surface of the element body and continuing to the end-side electrode part, and
a lower surface of the element body located on the other side of the upper surface along the lamination direction is entirely exposed outside.

In the multilayer ceramic electronic component according to the first aspect of the present invention, the terminal electrode is not substantially formed on the lower surface of the element body. In the multilayer ceramic electronic component according to the second aspect of the present invention, the lower surface of the element body is entirely exposed. In conventional electronic components, when an element body merely has a small thickness (e.g., 100 μm or less), a terminal electrode is hard to be formed on the element body.

For example, the multilayer ceramic electronic components according to the present invention can be formed by combining two or more thin element bodies, forming terminal electrodes, and thereafter separating the element bodies. It is thereby possible to easily manufacture a multilayer ceramic electronic component that is thinner by about ½ or more than conventional multilayer ceramic electronic components.

In the multilayer ceramic component to be obtained, the terminal electrode is not substantially formed on the lower surface of the element body, or the lower surface of the element body is entirely exposed. Then, the multilayer ceramic component can have a small total thickness of 100 μm or less (preferably 90 μm or less, more preferably 80 μm or less). This contributes to a low profile of the multilayer ceramic component.

Preferably, the lower surface of the element body is a flat surface. For example, this makes it easier to embed the multilayer ceramic component into a substrate. When the flat surface (the lower surface of the element body) is placed on a mount surface, the element body is attached on the mount surface, and the multilayer ceramic electronic component has an improved bending strength.

The upper surface or the lower surface of the element body may include a reinforcement layer made of a material whose elasticity or linear thermal expansion coefficient is lower than that of the insulation layers, and an outer surface of the reinforcement layer may define the upper surface or the lower surface of the element body.

This structure improves the bending strength of the multilayer ceramic electronic component. In the multilayer ceramic electronic component having an improved strength, the element body easily has a large length in the longitudinal direction and a large width, a facing area between the internal electrode layers inside the element body is large, and characteristics (e.g., capacitance) of the electronic component are improved.

The reinforcement layer may include a lateral cover part covering a side surface of the element body. This structure further improves the strength of the multilayer ceramic electronic component.

A multilayer ceramic electronic component according to a third aspect of the present invention includes:

an element body including internal electrode layers and insulation layers alternately laminated in a lamination direction; and a terminal electrode formed on an outer surface of the element body to be contacted and connected with the internal electrode layers, wherein the terminal electrode includes an end-side electrode part covering a leading end of the element body where the internal electrode layers are led, and the terminal electrode is not substantially formed on an upper surface of the element body along the lamination direction or a lower surface of the element body located on the other side of the upper surface along the lamination direction.

The multilayer ceramic electronic component according to the third aspect of the present invention includes a terminal electrode that is not substantially formed on an upper surface of the element body along the lamination direction or a lower surface of the element body and can thereby be thinner.

DETAILED DESCRIPTION OF INVENTION

Hereinafter, the present invention is described based on embodiments shown in the figures.

First Embodiment

As an embodiment of a multilayer ceramic electronic component according to the present embodiment, a multilayer ceramic capacitor is described.

Figure 1A:
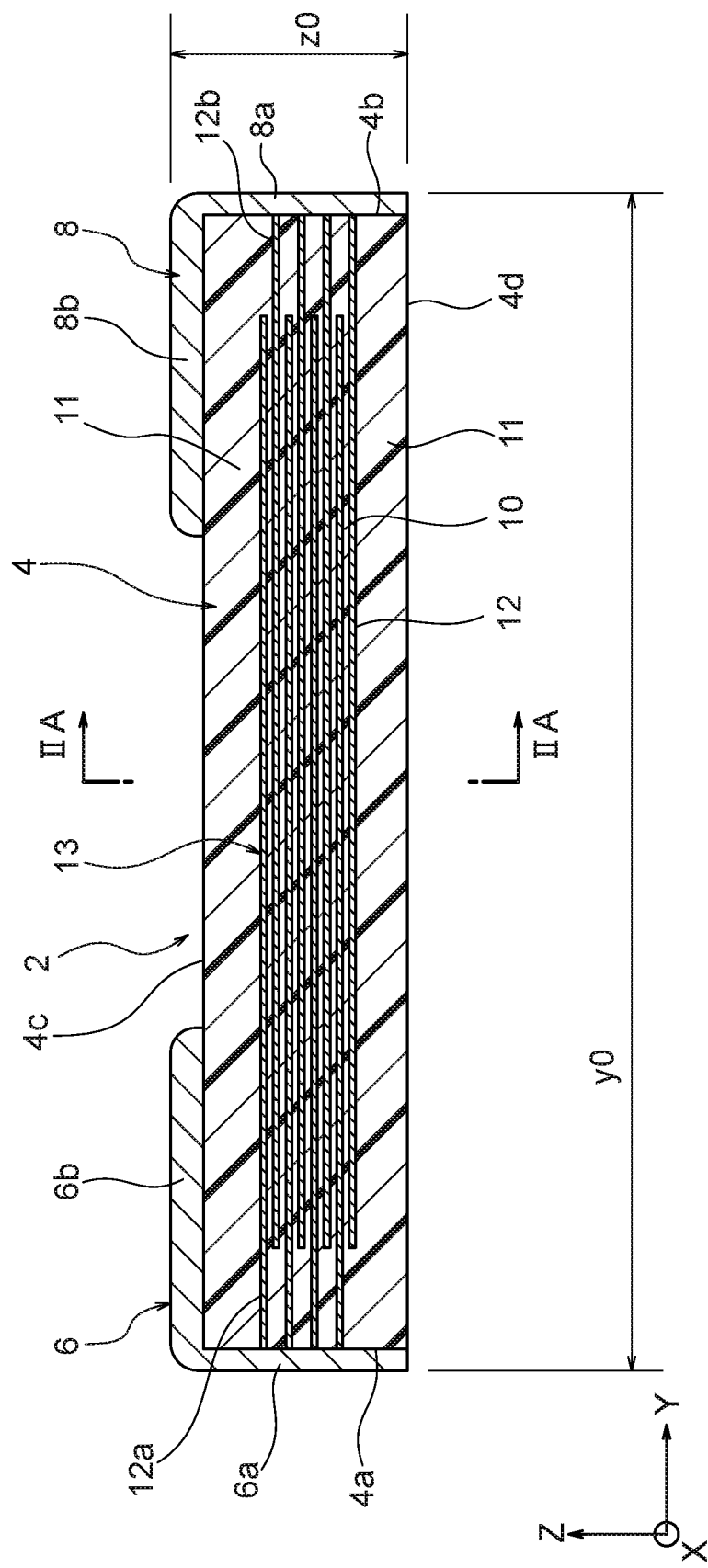
FIG. 1A is a longitudinal cross-sectional view of a multilayer ceramic capacitor according to an embodiment of the present invention.

As shown in FIG. 1A, a multilayer ceramic capacitor 2 according to the present embodiment includes an element body 4, a first terminal electrode 6, and a second terminal electrode 8. The element body 4 includes inner dielectric layers (insulation layers) 10 and internal electrode layers 12 in substantially parallel to the plane including the X-axis and the Y-axis. The internal electrode layers 12 are alternately laminated along the Z-axis direction between the inner dielectric layers 10. Here, "substantially parallel" means that most part is parallel, but there may be a part that is not slightly parallel. The internal electrode layers 12 and the inner dielectric layers 10 may slightly be uneven or inclined.

An interior region 13 is a region where the inner dielectric layers 10 and the internal electrode layers 12 are alternately laminated. The element body 4 has exterior regions 11 on both end surfaces of the element body 4 in its lamination direction Z (Z-axis). The exterior regions 11 are formed by laminating a plurality of outer dielectric layers that are thicker than the inner dielectric layers 10 constituting the interior region 13. Preferably, the thickness of the interior region 13 in the Z-axis direction is 10 to 75% of a total thickness z0 of the multilayer ceramic capacitor 2. The total thickness of the two exterior regions 11 is a value obtained by subtracting the thickness of the interior region 13 and the thickness of the terminal electrode 6 (8) from the total thickness z0.

Hereinafter, the "inner dielectric layers 10" and the "outer dielectric layers" may be referred to as the "dielectric layers" together.

The dielectric layers constituting the inner dielectric layers 10 and the exterior regions 11 may be made of the same material or different materials and are made of any material whose main component is a perovskite-type dielectric material, such as $ABO_3$.

In $ABO_3$, "A" is at least one of Ca, Ba, Sr, etc., and "B" is at least one of Ti, Zr, etc. The molar ratio of A/B is not limited and 0.980 to 1.020. In addition, the dielectric layers constituting the inner dielectric layers 10 and the exterior regions 11 may contain a sub-component of an oxide of rare earth element (at least one of Sc, Y, La, Ce, Pr, Nd, Pm, Sm, Eu, Gd, Tb, Dy, Ho, Er, Tm, Yb, and Lu), alkaline earth metal element (Mg and Mn), and transition metal element (at least one of V, W, and Mo), a mixture thereof, a composite oxide, a sintering agent containing $SiO_2$ as glass, and the like.

The alternately-laminated internal electrode layers 12 on one side have leading parts 12a electrically connected with the inner side of the first terminal electrode 6 formed on the outer side of the first end of the element body 4 in the Y-axis direction. The alternately-laminated internal electrode layers 12 on the other side have leading parts 12b electrically connected with the inner side of the second terminal electrode 8 formed on the outer side of the second end of the element body 4 in the Y-axis direction.

In the figures, the X-axis, the Y-axis, and the Z-axis are perpendicular to each other, the Z-axis corresponds to the lamination direction of the inner dielectric layers 10 and the internal electrode layers 12, and the Y-axis corresponds to a direction where the leading parts 12a and 12b are led.

Figure 2A:
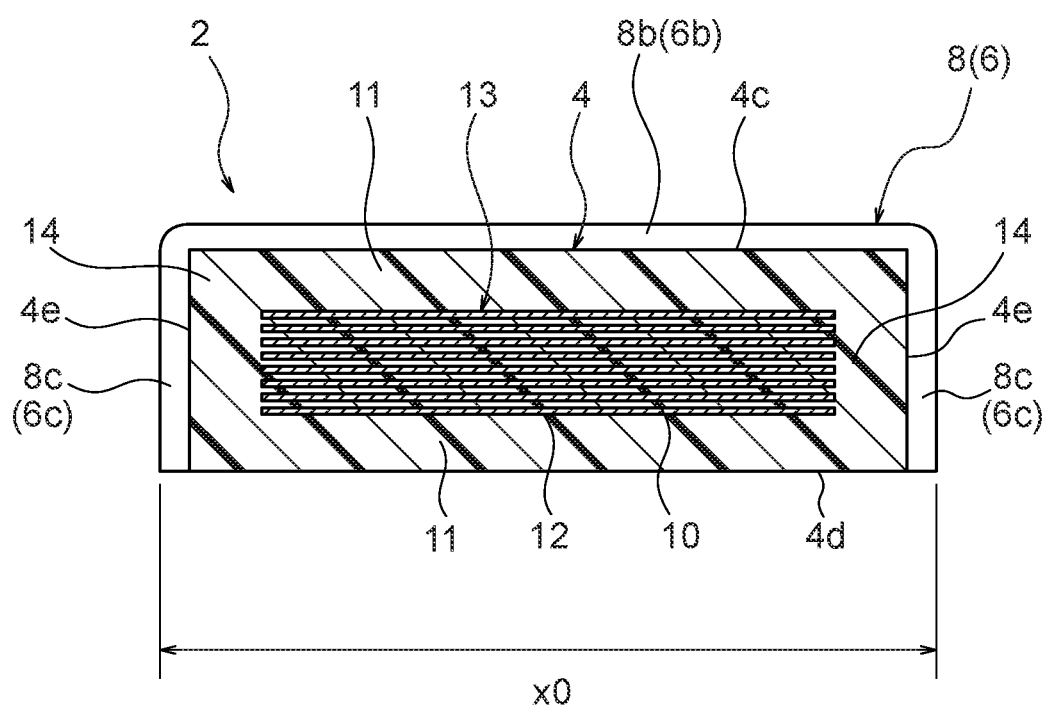
FIG. 2A is a transverse cross-sectional view of the multilayer ceramic capacitor along the IIA-IIA line shown in FIG. 1A.
Figure 2A:
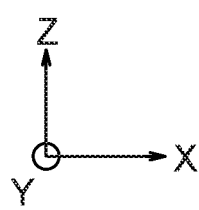

The interior region 13 has a capacitance region and a leading region. The capacitance region is a region where the internal electrode layers 12 sandwich the inner dielectric layers 10 and are laminated along the lamination direction. The leading region is located between the leading parts 12a (12b) of the internal electrode layers 12 connected with the terminal electrode 6 (8). Moreover, side-gap regions 14 shown in FIG. 2A are located on both ends of the internal electrode layers 12 in the X-axis direction and protect the internal electrode layers 12. The side-gap regions 14 are normally made of a dielectric material similar to that of the inner dielectric layers 10 or the exterior regions 11, but may be made of a glass material to be a reinforcement layer mentioned below. The exterior regions 11 may also be made of a glass material.

A conductive material contained in the internal electrode layers 12 is any material, such as metal of Ni, Cu, Ag, Pd, Al, Pt, etc. and alloy of these metals. The Ni alloy is preferably an alloy of Ni and one or more elements of Mn, Cr, Co, and Al and preferably contains 95 wt % or more of Ni. Incidentally, Ni or the Ni alloy may contain about 0.1 wt % or less of various fine components, such as P.

The terminal electrodes 6 and 8 are made of any material, such as at least one of Ni, Pd, Ag, Au, Cu, Pt, Rh, Ru, Jr, etc. and alloy of these elements. The terminal electrodes 6 and 8 are normally made of Cu, Cu alloy, Ni, Ni alloy, Ag, Ag—Pd alloy, In—Ga alloy, or the like.

In the present embodiment, the terminal electrodes 6 and 8 are respectively formed on end surfaces 4a and 4b of the element body 4 in the Y-axis direction and may be a single film or a multilayer film. The terminal electrodes 6 and 8 of the present embodiment have end-side electrode parts 6a and 8a covering the end surfaces 4a and 4b (leading ends of the element body 4 where the leading parts 12a and 12b of the internal electrode layers 12 are led). Moreover, the terminal electrodes 6 and 8 of the present embodiment have upper electrode parts 6b and 8b formed on a part of an upper surface 4c of the element body 4 in the Z-axis (lamination direction) and continuing to the end-side electrode parts 6a and 8a.

Moreover, as shown in FIG. 2A, the terminal electrodes 6 and 8 of the present embodiment have lateral electrode parts 6c and 8c formed on side surfaces 4c and 4e located on both sides of the element body 4 in the X-axis direction and continuing to the upper electrode parts 6b and 8b and the end-side electrode parts 6a and 8a. As shown in FIG. 1A, the terminal electrodes 6 and 8 are insulated on the outer surface of the element body 4 with a predetermined distance in the Y-axis direction.

The terminal electrode 6 (8) may be the same or different in thickness among the upper electrode part 6b (8b), the end-side electrode part 6a (8a), and the lateral electrode part 6c (8c) and has a thickness of 2 to 15 µm, for example. In the present embodiment, the upper electrode part 6b (8b) and the lateral electrode part 6c (8c) are thicker than the end-side electrode part 6a (8a) by 100 to 750%.

In the present embodiment, the terminal electrodes 6 and 8 are not substantially formed on a lower surface 4d of the element body 4 located on the other side of the upper surface 4c of the element body 4 in the Z-axis direction. That is, the lower surface 4d of the element body 4 is not covered with the terminal electrode 6 or 8 and is entirely exposed outside. In addition, the lower surface 4d of the element body 4 is formed on a flat surface. Unlike the upper surface 4c, since the lower surface 4d is not covered with the terminal electrode 6 or 8, the lower surface 4d does not have a step convex part of the upper electrode parts 6b and 8b and is excellent in flatness.

The multilayer ceramic capacitor 2 has a shape and a size appropriately determined based on purpose and use. In the present embodiment, the multilayer ceramic capacitor 2 can have a small total thickness $z_0$ in the Z-axis direction (e.g., 100 µm or less, preferably 90 µm or less, and more preferably 80 µm or less). This contributes to a low profile of the multilayer ceramic capacitor 2.

In the present embodiment, the length $y_0$ of the capacitor 2 in the Y-axis direction (longitudinal length) can be three times or more than the thickness $z_0$ and can preferably be 300 µm or more (more preferably, 400 to 1200 µm), and the width $x_0$ of the capacitor 2 in the X-axis direction can be twice or more than the thickness $z_0$ and can preferably be 200 µm or more (more preferably, 200 to 600 µm).

In the present embodiment, the capacitor 2 may appropriately be configured to have a longitudinal direction in the X-axis direction and a short direction in the Y-axis direction. In this case, the length $x_0$ of the capacitor 2 in the X-axis direction can be three times or more than the thickness $z_0$ and can preferably be 300 µm or more (more preferably, 400 to 1200 µm), and the length $y_0$ of the capacitor 2 in the Y-axis direction can be twice or more than the thickness $z_0$ and can preferably be 200 µm or more (more preferably, 200 to 600 µm).

Figure 5:
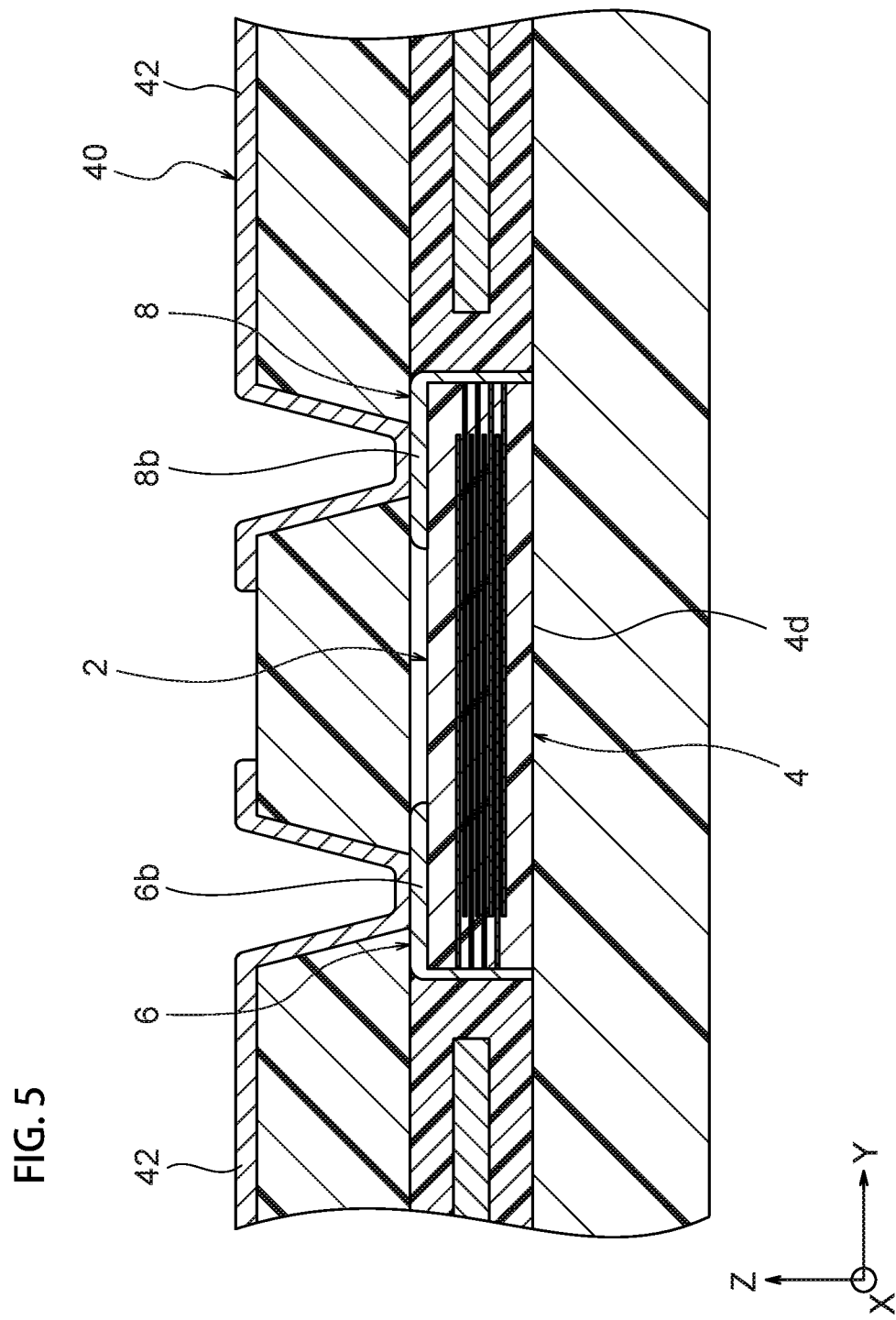
FIG. 5 is a cross-sectional view of a main part of the multilayer ceramic capacitor shown in FIG. 1A illustrating a use example thereof.

In the multilayer ceramic capacitor according to the present embodiment, the multilayer ceramic capacitor 2 can have a small total thickness $z_0$ in the Z-axis direction (e.g., 100 µm or less, preferably 90 µm or less, and more preferably 80 µm or less). Since the lower surface 4d of the element body 4 is a flat surface, the capacitor 2 is easily embedded into a multilayer substrate 40 as shown in, for example, FIG. 5. In FIG. 5, a wiring pattern 42 formed on the multilayer substrate 40 is connected with the upper electrode parts 6b and 8b of the terminal electrodes 6 and 8 of the capacitor 2 via a through hole electrode or so. In the present embodiment, when the flat surface (the lower surface of the element body 4) is placed on a mount surface, the element body 4 is attached on the mount surface, and the multilayer ceramic capacitor 2 has an improved bending strength.

Figure 6:
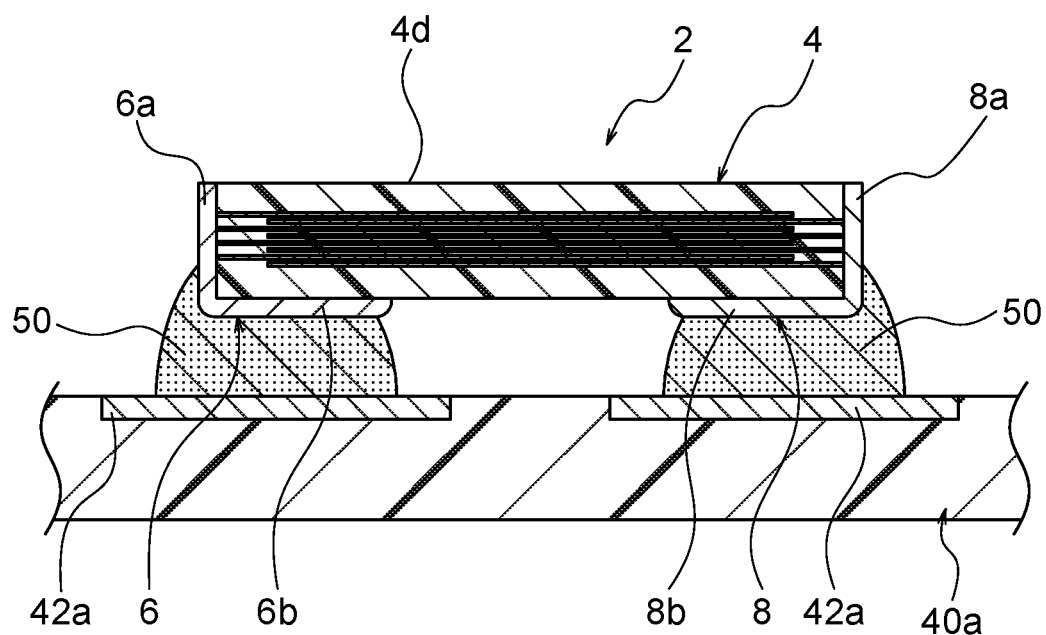
FIG. 6 is a cross-sectional view of a main part of the multilayer ceramic capacitor shown in FIG. 1A illustrating a use example thereof.
Figure 6:
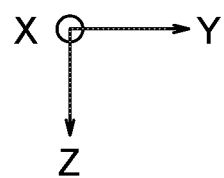

Incidentally, as shown in FIG. 6, the multilayer ceramic capacitor 2 according to the present embodiment may be placed on a circuit board 40a using a solder 50. In this case, the multilayer ceramic capacitor 2 is disposed upside down in the Z-axis direction, and the upper electrode parts 6b and 8b of the terminal electrodes 6 and 8 face downward in the figure and are connected with a wiring pattern 42a of the circuit board 40a by the solder 50. Incidentally, the solder 50 includes a solder fillet and is also in contact with the end-side electrode parts 6a and 8a of the terminal electrodes 6 and 8.

In the present embodiment, the exterior regions 11 forming the upper surface 4c and the lower surface 4d of the element body 4 may be made of a dielectric material that is stronger than the inner dielectric layers 10. This structure further improves the bending strength of the multilayer ceramic capacitor 2. When the multilayer ceramic capacitor 2 has an improved strength, the element body 4 easily has a large length $y_0$ in the longitudinal direction or a large width $x_0$, a facing area between the internal electrode layers 12 in the element body 4 is large, and characteristics (e.g., capacitance) are improved. Moreover, the side-gap regions 14 shown in FIG. 2A may be made of a dielectric material that is stronger than the inner dielectric layers 10.

Next, specifically described is a method of manufacturing the multilayer ceramic capacitor 2 as an embodiment of the present invention.

Figure 1B:
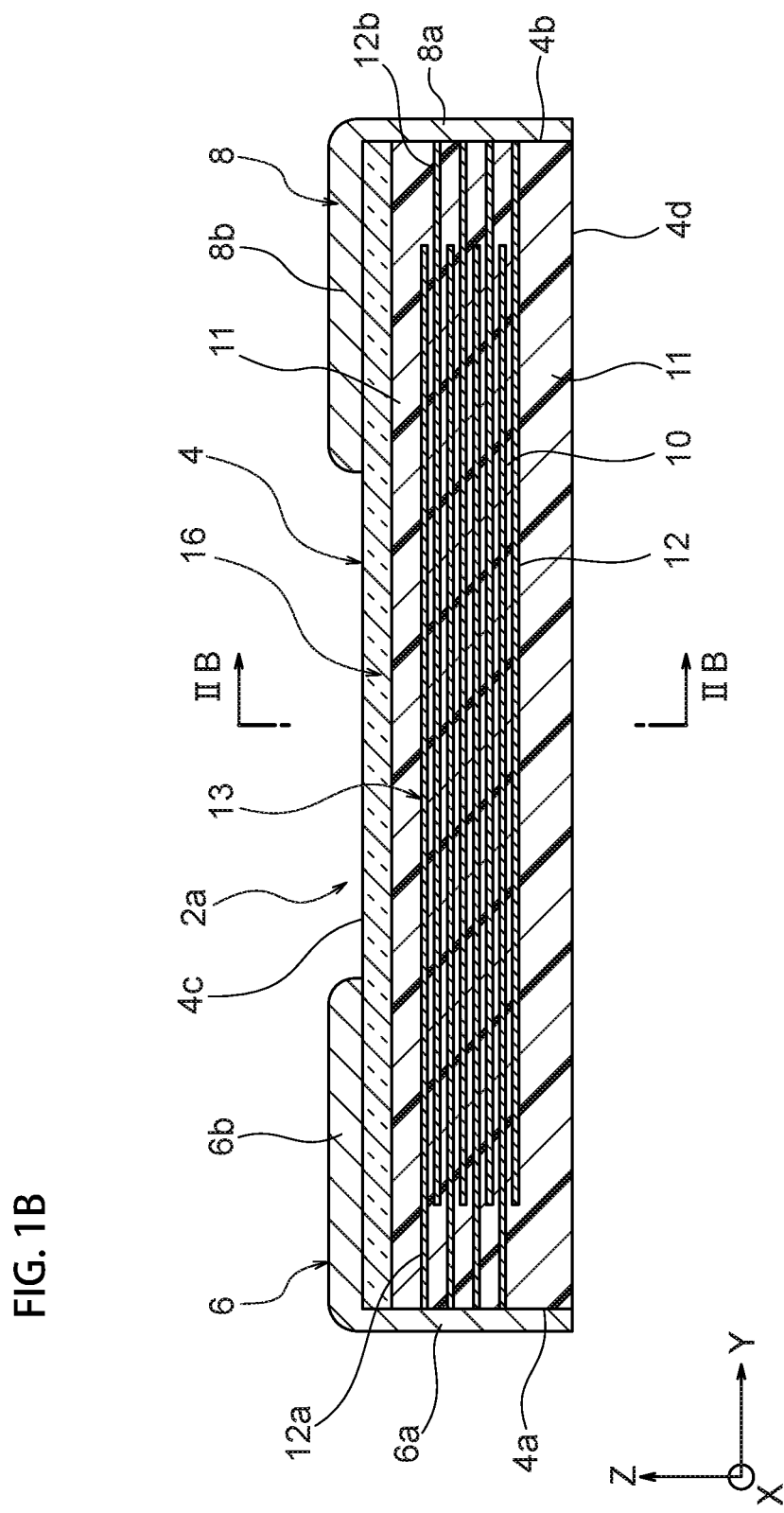
FIG. 1B is a longitudinal cross-sectional view of a multilayer ceramic capacitor according to another embodiment of the present invention.
Figure 1C:
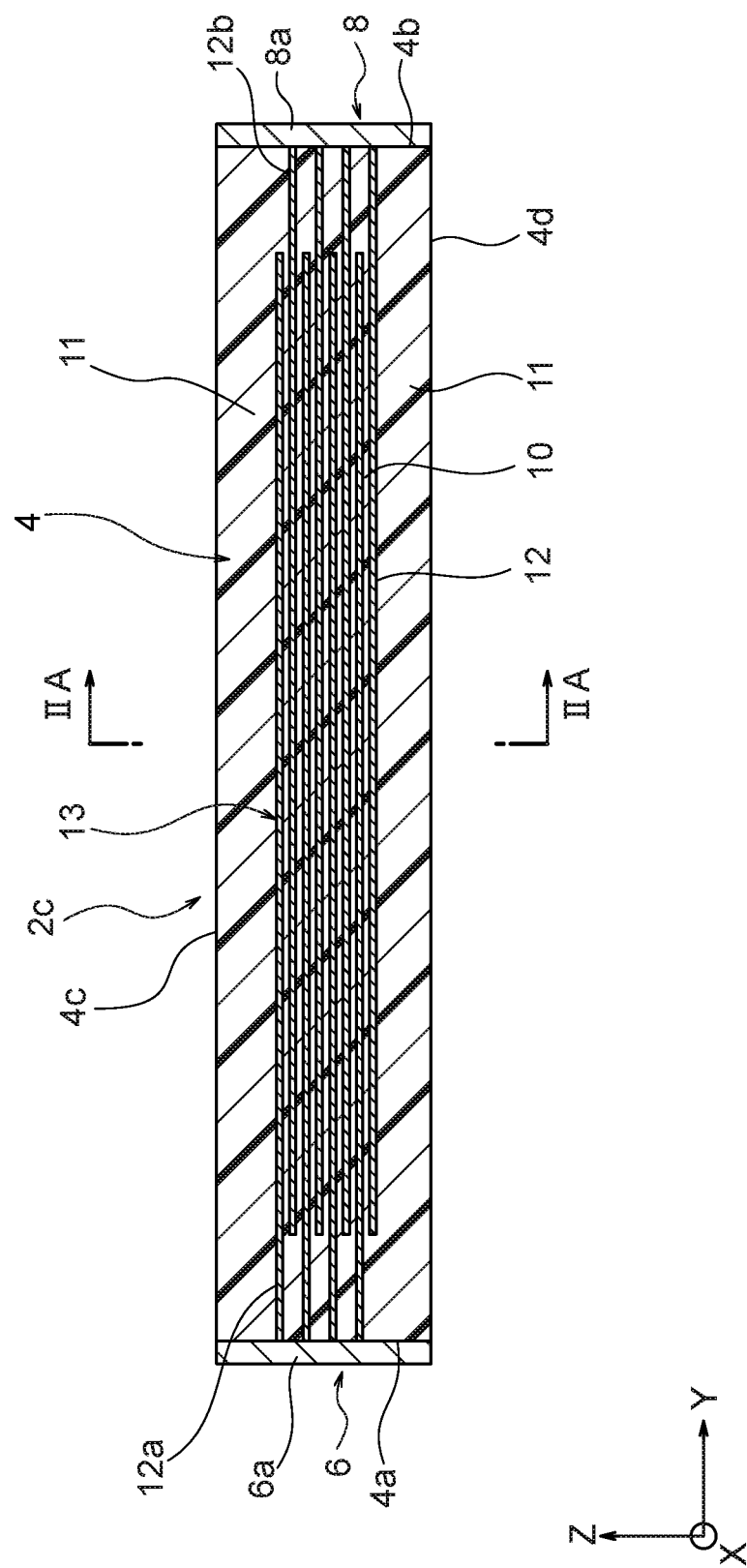
FIG. 1C is a longitudinal cross-sectional view of a multilayer ceramic capacitor according to further another embodiment of the present invention.

To manufacture inner green sheets that will constitute the inner dielectric layers 10 shown in FIGS. 1A-1C after firing and outer green sheets that will be constituting the exterior regions 11 after firing, a paste for the inner green sheets and a paste for the outer green sheets are initially prepared. The paste for the inner green sheets and the paste for the outer green sheets are made of an aqueous paste or an organic-solvent-based paste obtained by kneading a ceramic powder with an organic vehicle.

A raw material of the ceramic powder may appropriately be selected from various compounds to be a composite oxide or an oxide, such as carbonate, nitrate, hydroxide, and organometallic compound, and these various compounds can be mixed for use. In the present embodiment, the raw material of the ceramic powder is preferably used as a powder having an average grain size of 0.45 µm or less (preferably, about 0.1 to 0.3 µm). To obtain extremely thin inner green sheets, it is preferable to use a powder that is finer than the thickness of the green sheets.

The organic vehicle is an organic solvent in which a binder is dissolved. The binder used for the organic vehicle may be any binder selected appropriately from normally used various binders, such as ethyl cellulose and polyvinyl butyral. The organic solvent to be used may also be any solvent appropriately selected from various organic solvents, such as acetone and methyl ethyl ketone.

If necessary, the pastes for the green sheets may be added with an additive selected from various dispersants, plasticizes, dielectrics, sub-component chemical compound, glass frit, insulators, and the like.

Examples of the plasticizers include phthalic acid esters (e.g., dioctyl phthalate and benzylbutyl phthalate), adipic acid, phosphoric esters, and glycols.

To manufacture internal electrode pattern layers that will be constituting the internal electrode layers 12 shown in FIG. 1A after firing, a paste for the internal electrode layers is subsequently prepared. The paste for the internal electrode layers is prepared by kneading a conductive material made of the above-described various conductive metals or alloys with the above-described organic vehicle.

A paste for the terminal electrodes that will be constituting the terminal electrodes 6 and 8 shown in FIG. 1A after firing is prepared similarly to the above-mentioned paste for the internal electrode layers.

Figure 4:
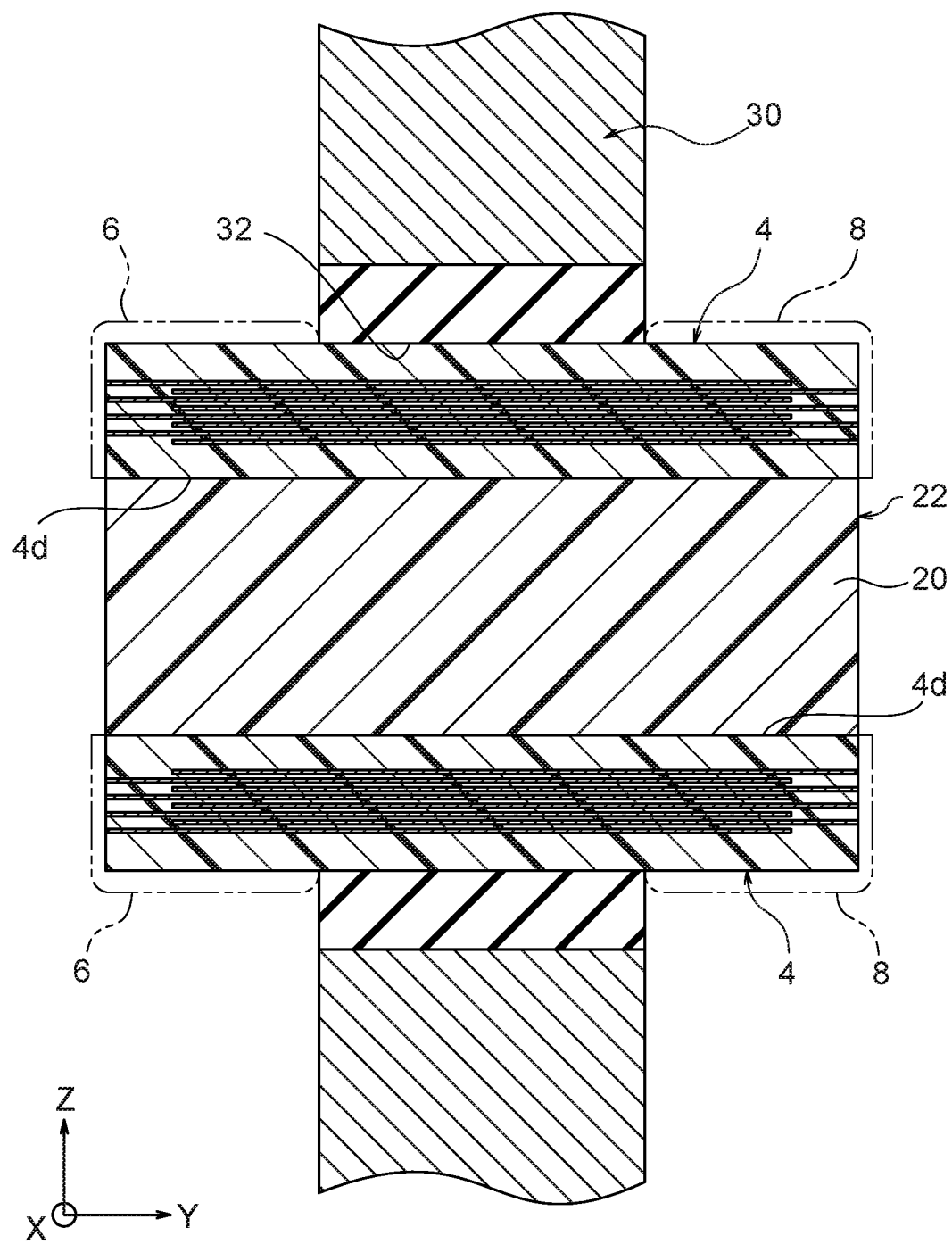
FIG. 4 is a cross-sectional view of a main part of the multilayer ceramic capacitor shown in FIG. 1A illustrating a manufacturing step thereof.

An internal multilayer body is manufactured by alternately laminating the inner green sheets and the internal electrode pattern layers as shown in FIG. 4 using the paste for the inner green sheets and the paste for the internal electrode layers prepared in the above-mentioned manner. After the internal multilayer body is manufactured, a green multilayer body is obtained by forming outer green sheets using the paste for the outer green sheets and pressing them in the lamination direction.

Instead of the above-mentioned method, the green multilayer body may be obtained by alternately directly laminating a predetermined number of the inner green sheets and the internal electrode pattern layers on the outer green sheets and pressing them in the lamination direction.

Specifically, the inner green sheets are formed on carrier sheets (e.g. PET film) as a support member by a doctor blade method or so. The inner green sheets are dried after being formed on the carrier sheets.

Next, the inner green sheets with the internal electrode pattern layers are obtained by forming the internal electrode pattern layers on the surfaces of the inner green sheets using the paste for the internal electrode pattern layers. After the internal multilayer body is manufactured by laminating the multiple inner green sheets with the internal electrode pattern layers, a green multilayer body is subsequently obtained by forming an appropriate number of the outer green sheets on the top and bottom of the internal multilayer body using the paste for the outer green sheets and pressing them in the lamination direction.

Next, green chips are obtained by cutting the green multilayer body into pieces. Incidentally, the internal electrode pattern layers are formed by any method for forming thin films, such as printing method, transfer method, vapor deposition, and sputtering.

The green chips are solidified by removing the plasticizer based on solidification and dry. The element body 4 is obtained by subjecting the green chips after the solidification and dry to a debinding step, a firing step, and if necessary, an annealing step. The debinding step, the firing step, and the annealing step may be carried out continuously or independently.

Next, the terminal electrodes 6 and 8 are formed by applying the paste for the terminal electrodes onto both end surfaces of the element body 4 in the Y-axis direction and firing it. When the terminals 6 and 8 are formed, as shown in FIG. 4 for example, a dummy block 20 is temporarily adhered between the lower surfaces 4d and 4d of two element bodies 4 and 4, and a work 22 is initially obtained by integrating them.

The dummy block 20 is preferably made of a material that is removable in the following steps and is preferably made of a material to which the paste for the terminal electrodes is hard to attach. The dummy block 20 is made of, for example, silicone rubber, nitrile rubber, polyurethane, fluorine resin, PET resin, or PEN resin. Preferably, the dummy block 20 has a width in the X-axis direction and a width in the Y-axis direction that are respectively substantially equal to those of the element body 4. The dummy block 20 may be as thick as the element body 4 in the Z-axis direction or may be thicker or thinner than the element body 4 in the Z-axis direction.

Incidentally, the work 22 may be formed without the dummy block 20 by directly adhering the lower surfaces 4d and 4d of the two element bodies 4 and 4 using an adhesive that is removable in the following steps. For example, the adhesive is preferably modified silicone polymer, PVA aqueous solution paste, water-soluble acrylic resin aqueous solution paste, modified polyurethane, two-component adhesive (modified silicone and epoxy resin), starch paste, etc. Instead of the dummy block 20, the work 22 may be formed by adhering one or more element bodies 4 between the two element bodies 4 and 4.

Since the two or more element bodies 4 are combined, the work 22 has an easy-to-handle thickness even if the element bodies 4 and 4 are thin in the Z-axis direction, and the terminal electrodes 6 and 8 can be formed as before by attaching the work 22 to a through hole 32 of a holding plate 30. Incidentally, the terminal electrodes 6 and 8 can be formed by any appropriate method, such as coating and firing, plating, vapor deposition, and sputtering of the paste for terminal electrodes. If necessary, a cover layer is formed on the surfaces of the terminal electrodes 6 and 8 by plating or so. The cover layer is gold plating, tin plating, or the like.

After the terminal electrodes 6 and 8 are formed, the two element bodies 4 and 4 are separated by removing the dummy block 20 or so, and the multilayer ceramic electronic component 2 shown in FIG. 1A is thereby obtained. That is, obtained is the capacitor 2 where the terminal electrodes 6 and 8 are not substantially formed on the lower surface 4d of the element body 4, and where the lower surface 4d of the element body 4 is entirely exposed outside.

The multilayer ceramic capacitor 2 of the present embodiment manufactured in the above-mentioned manner is mounted on a print board or so by soldering or so and is used for various electronic devices. Instead, as shown in FIG. 5, the multilayer ceramic capacitor 2 of the present embodiment is used by being embedded into the multilayer substrate 40.

The multilayer ceramic capacitor 2 of the present embodiment becomes thinner by about ½ or more than conventional multilayer ceramic capacitors by separating the element body after the terminal electrodes 6 and 8 are formed.

In the multilayer ceramic capacitor 2 to be obtained, the terminal electrodes 6 and 8 are not substantially formed on the lower surface 4d of the element body 4, or the lower surface 4d of the element body 4 is entirely exposed. Then, the multilayer ceramic capacitor 2 can have a small total thickness z0 of 100 μm or less (preferably 90 μm or less, more preferably 80 μm or less). That is, this contributes to a low profile of the multilayer ceramic capacitor.

In the present embodiment, the lower surface 4d of the element body 4 is a flat surface. This makes it easier to embed the capacitor 2 into the multilayer substrate 40 as shown in, for example, FIG. 5. When the flat surface (the lower surface 4d of the element body 4) is placed on a mount surface, the element body 4 is attached on the mount surface, and the multilayer ceramic electronic capacitor has an improved bending strength.

Second Embodiment

Figure 2B:
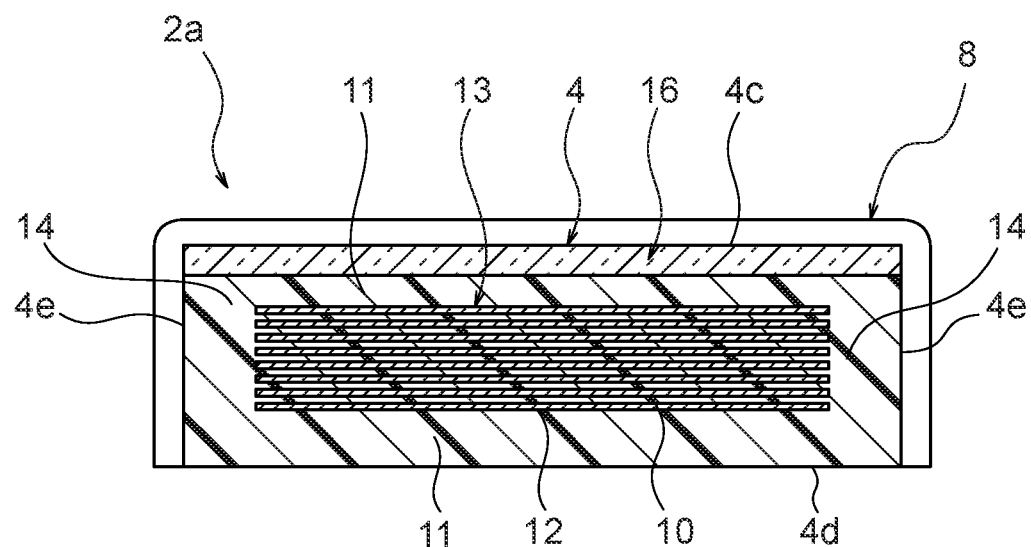
FIG. 2B is a transverse cross-sectional view of the multilayer ceramic capacitor along the IIB-IIB line shown in FIG. 1B.
Figure 2B:
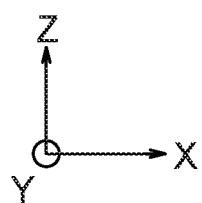

Except for the following matters, as shown in FIG. 1B and FIG. 2B, a multilayer ceramic capacitor 2a according to the present embodiment is similar to the multilayer ceramic capacitor 2 according to First Embodiment. In the multilayer ceramic capacitor 2a, the upper surface 4c (or the lower surface 4d) of the element body 4 includes a reinforcement layer 16 made of a material that is stronger than the inner dielectric layers 10, and the outer surface of the reinforcement layer 16 defines the upper surface 4c (or the lower surface 4d) of the element body 4.

After the element body 4 is formed similarly to First Embodiment, the reinforcement layer 16 is formed on the upper surface 4c (or the lower surface 4d) of the element body 4 before the terminal electrodes 6 and 8 are formed. The reinforcement layer 16 is not limited and is glass, alumina based composite material, zirconia based composite material, polyimide resin, epoxy resin, aramid fiber, fiber reinforced plastic, or the like.

This structure improves the bending strength of the multilayer ceramic capacitor 2a. In the multilayer ceramic capacitor 2a having an improved strength, even if the element body 4 is thin, the element body 4 easily has a large length y0 in the longitudinal direction (see FIG. 1A) and a large width x0 (see FIG. 2A), a facing area between the internal electrode layers 12 inside the element body 4 is large, and characteristics (e.g., capacitance) of the capacitor 2b are further improved.

Incidentally, the reinforcement layer 16 may contain any glass components, but preferably contains $SiO_2$, BaO, $Al_2O_3$, alkali metal, CaO, SrO, and $B_2O_3$. Preferably, 30 to 70 mass % of $SiO_2$, which is contained as a glass component of the reinforcement layer 16, are contained in the glass components of the reinforcement layer 16. When the above-mentioned amount of $SiO_2$ is contained, an adequate amount of a network-former oxide is obtained, and plating resistance is favorable, compared to when less amount of $SiO_2$ is contained. When the above-mentioned amount of $SiO_2$ is contained, a softening point is prevented from being too high, and an operation temperature is prevented from being too high, compared to when more amount of $SiO_2$ is contained.

Preferably, 20 to 60 mass % of BaO, which is contained as a glass component of the reinforcement layer 16 of the present embodiment, are contained in the glass components of the reinforcement layer 16. When the above-mentioned amount of BaO is contained, compared to when less amount of BaO is contained, delamination is less likely to occur due to favorable adhesion with the dielectric, crack is less likely to occur due to prevention of thermal expansion coefficient from being too small, and in a case where the dielectric layers are $BaTiO_3$, HALT reliability is prevented from being worse due to prevention of Ba from being eluted into the glass components. When the above-mentioned amount of BaO is contained, vitrification and plating resistance are favorable, compared to when more amount of BaO is contained.

Preferably, 1 to 15 mass % of $Al_2O_3$, which is contained as a glass component of the reinforcement layer 16 of the present embodiment, are contained in the glass components of the reinforcement layer 16. When the above-mentioned amount of $Al_2O_3$ is contained, plating resistance is favorable, compared to when less amount of $Al_2O_3$ is contained. When the above-mentioned amount of $Al_2O_3$ is contained, a softening point is prevented from being too high, compared to when more amount of $Al_2O_3$ is contained.

Preferably, 70 to 100 mass % of $SiO_2$, BaO, and $Al_2O_3$ are contained in total in the glass components constituting the reinforcement layer 16 of the present embodiment. This makes it easy to form a Ba—Ti—Si—O phase in a boundary between the dielectric and the reinforcement layer 16.

The alkali metal contained as a glass component constituting the reinforcement layer 16 of the present embodiment is Li, Na, K, etc., but is preferably K or Na in view of thermal expansion coefficient. Preferably, 0.1 to 15 mass % of the alkali metal, which is contained as a glass component constituting the reinforcement layer 16 of the present embodiment, are contained in the glass components of the reinforcement layer 16. This can increase thermal expansion coefficient. When the above-mentioned amount of the alkali metal is contained, plating resistance can be favorable, compared to when more amount of the alkali metal is contained.

Preferably, 0 to 15 mass % of CaO, which is contained as a glass component constituting the reinforcement layer 16 of the present embodiment, are contained in the glass components of the reinforcement layer 16. This can increase thermal expansion coefficient and improve plating resistance.

Preferably, 0 to 20 mass % of SrO, which is contained as a glass component constituting the reinforcement layer 16 of the present embodiment, are contained in the glass components of the reinforcement layer 16. This can increase thermal expansion coefficient and improve plating resistance. When the above-mentioned amount of SrO is contained, insulation and reliability of the chip can be improved due to prevention of SrO from reacting with $BaTiO_3$, compared to when more amount of SrO is contained.

Preferably, 0 to 10 mass % of $B_2O_3$, which is contained as a glass component constituting the reinforcement layer 16 of the present embodiment, are contained in the glass components of the reinforcement layer 16. This can demonstrate the effect of the glass as a network-former oxide. When the above-mentioned amount of $B_2O_3$ is contained, plating resistance can be favorable compared to when more amount of $B_2O_3$ is contained.

In the present embodiment, the reinforcement layer 16 constitutes only a part of the outer surface of the exterior region 11, but may constitute most or the whole of the exterior region 11. The reinforcement layer 16 can be formed by applying a paste for the reinforcement layer on the upper surface 4c or the lower surface 4d of the element body 4 and firing it.

The paste for the reinforcement layer is obtained by, for example, kneading the above-mentioned glass raw material, a binder whose main component is ethyl cellulose, and tarpineol and acetone (dispersion medium) using a mixer. The paste for the reinforcement layer is applied to the element body 4 by any method, such as dipping, printing, coating, vapor deposition, and spraying.

The element body 4 applied with the paste for the reinforcement layer is fired with any conditions and is, for example, fired by being held at 700° C. to 1300° C. for 0.1 to 3 hours in a humidified or dry $N_2$ atmosphere.

Third Embodiment

Figure 2C:
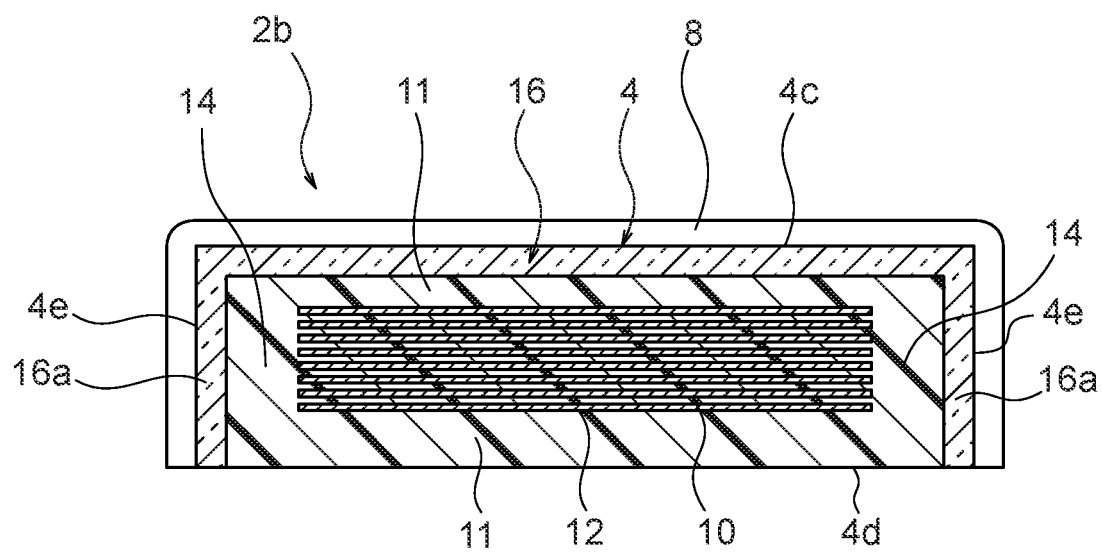
FIG. 2C is a transverse cross-sectional view according to a variation of the multilayer ceramic capacitor shown in FIG. 2B.
Figure 2C:
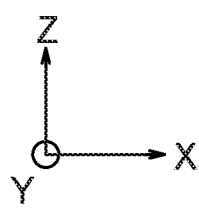
Figure 3:
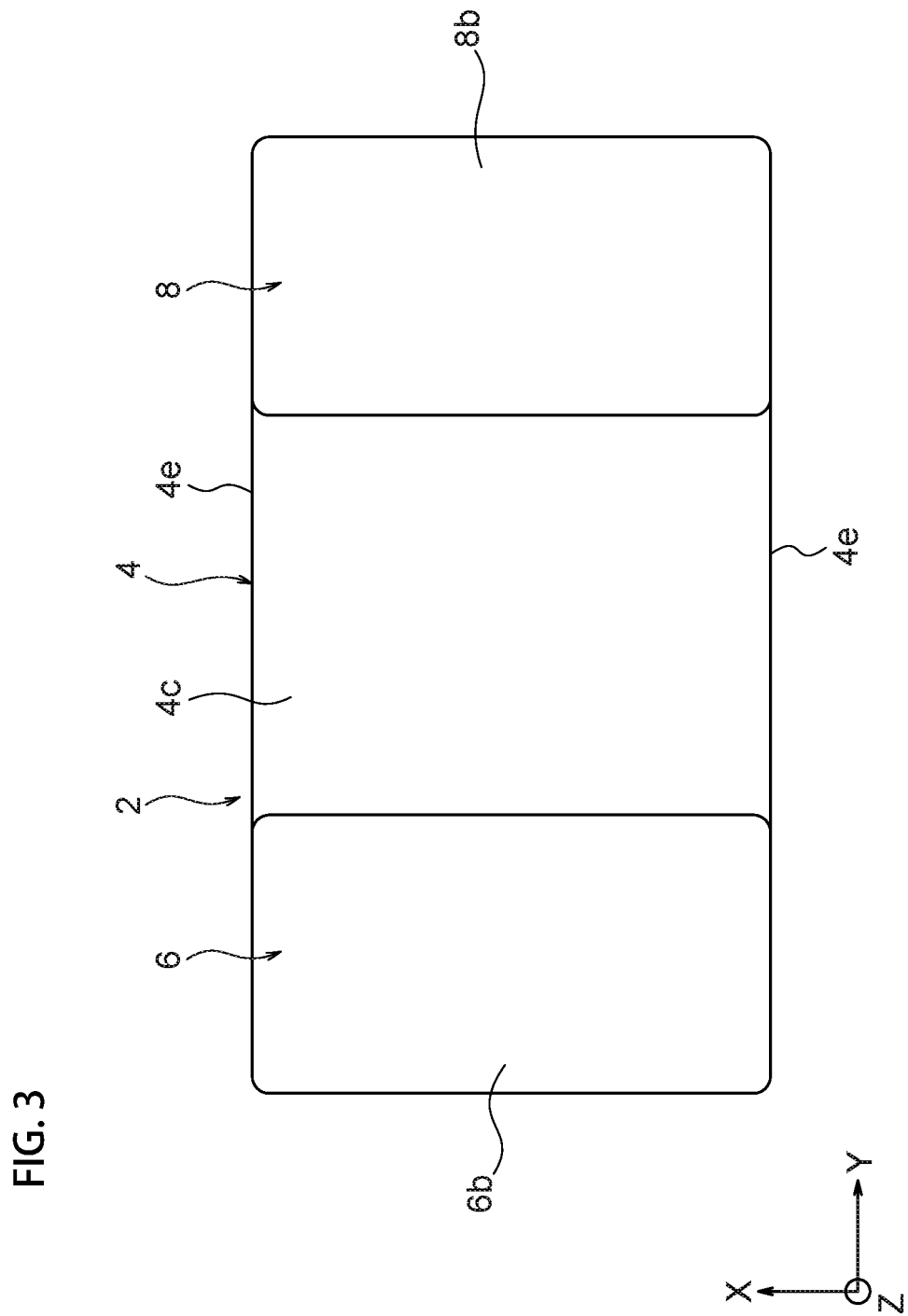
FIG. 3 is a plane view of the multilayer ceramic capacitor shown in FIG. 1A.

Except for the following matters, as shown in FIG. 2C, a multilayer ceramic capacitor 2b according to the present embodiment is similar to the multilayer ceramic capacitor 2a according to Second Embodiment. In the multilayer ceramic capacitor 2b, the reinforcement layer 16 has lateral cover parts 16a covering the side surfaces 4e of the element body 4. The lateral cover parts 16a are formed continuously with the reinforcement layer 16 of Second Embodiment. This structure further improves the strength of the multilayer ceramic capacitor.

Incidentally, FIG. 2C illustrates that each of the lateral cover parts 16a constitutes only a part of the side surface 4e of the side-gap region 14, but may constitute the whole of the side-gap region 14. That is, the lateral cover parts 16a may be in contact with the ends of the internal electrode layers 12 in the X-axis direction.

The present invention is not limited to the above-mentioned embodiments and may variously be changed within the scope of the present invention.

For example, instead of the dummy block 20 shown in FIG. 4, when one or more element bodies 4 are arranged and adhered, the element bodies 4 include only the end-side electrode parts 6a and 8a and the lateral electrode parts 6c and 8c. That is, in this case, obtained is a multilayer ceramic capacitor 2c including terminal electrodes 6 and 8 that are not substantially formed on either the lower surface 4d or the upper surface 4c of the element body 4 as shown in FIG. 1C. Thus, the multilayer ceramic capacitor 2c is thinner as it includes the terminal electrodes 6 and 8 that are not substantially formed on either the lower surface 4d or the upper surface 4c of the element body 4.

The multilayer ceramic electronic component of the present invention is not limited to multilayer ceramic capacitors and may be applied to other multilayer electronic components. Other multilayer electronic components are all electronic components where dielectric layers (insulation layers) are laminated via internal electrodes and are, for example, bandpass filters, inductors, multilayer three-terminal filters, piezoelectric elements, PTC thermistors, NTC thermistors, and varistors.

DESCRIPTION OF THE REFERENCE NUMERICAL 2, 2a, 2b, 2c . . . multilayer ceramic capacitor
4 . . . element body
4a, 4b . . . leading end
4c . . . upper surface
4d . . . lower surface
4e . . . side surface
6 . . . first terminal electrode
6a . . . end-side electrode part
6b . . . upper electrode part
6c . . . lateral electrode part
8 . . . second terminal electrode
8a . . . end-side electrode part
8b . . . upper electrode part
8c . . . lateral electrode part
10 . . . inner dielectric layer
11 . . . exterior region
12 . . . internal electrode layer
12a, 12b . . . leading part
13 . . . interior region
14 . . . side-gap region
16 . . . reinforcement layer
16a . . . lateral cover part
20 . . . dummy block
22 . . . work
30 . . . holding plate
32 . . . through hole
40 . . . multilayer substrate
40a . . . circuit board
42, 42a . . . wiring pattern
50 . . . solder

What is claimed is:

1. A multilayer ceramic electronic component comprising:
an element body including:
internal electrode layers and dielectric layers alternately laminated in a lamination direction, the dielectric layers having a main component of a dielectric material;
an upper surface;
a lower surface located on a side of the element body opposite the upper surface, in the lamination direction; and
a reinforcement layer included in the upper surface or the lower surface, made of a material whose elasticity or linear thermal expansion coefficient is lower than that of the dielectric layers, and comprised of a glass component including 30 to 70 mass % of SiO2, an outer surface of the reinforcement layer defining the upper surface or the lower surface, an inner surface of the reinforcement layer defining a boundary to one of the dielectric layers; and
a terminal electrode disposed on an outer surface of the element body to be contacted and connected with the internal electrode layers, the terminal electrode being not substantially disposed on the lower surface of the element body, the terminal electrode including:
an end-side electrode part covering a leading end of the element body where the internal electrode layers are led; and
an upper-side electrode part disposed on a part of the upper surface of the element body and continuing to the end-side electrode part,
wherein a thickness of the multilayer ceramic electronic component is less than 100 μm.

2. The multilayer ceramic electronic component according to claim 1, wherein the lower surface of the element body is a flat surface.

3. The multilayer ceramic electronic component according to claim 1, wherein the reinforcement layer includes a lateral cover part covering a side surface of the element body.

4. The multilayer ceramic electronic component according to claim 1, wherein the glass component includes 20 to 60 mass % of BaO.

5. A multilayer ceramic electronic component comprising:
an element body including:

internal electrode layers and dielectric layers alternately laminated in a lamination direction, the dielectric layers having a main component of a dielectric material;

an upper surface;

a lower surface located on a side of the element body opposite the upper surface, in the lamination direction, the lower surface being entirely exposed to an outside; and a reinforcement layer included in the upper surface or the lower surface, made of a material whose elasticity or linear thermal expansion coefficient is lower than that of the dielectric layers, and comprised of a glass component including 30 to 70 mass % of $SiO_2$, an outer surface of the reinforcement layer defining the upper surface or the lower surface, an inner surface of the reinforcement layer defining a boundary to one of the dielectric layers; and a terminal electrode disposed on an outer surface of the element body to be contacted and connected with the internal electrode layers, the terminal electrode including:

an end-side electrode part covering a leading end of the element body where the internal electrode layers are led; and an upper-side electrode part disposed on a part of the upper surface of the element body and continuing to the end-side electrode part, wherein a thickness of the multilayer ceramic electronic component is less than 100 μm.

6. The multilayer ceramic electronic component according to claim 5, wherein the lower surface of the element body is a flat surface.

7. The multilayer ceramic electronic component according to claim 5, wherein the reinforcement layer includes a lateral cover part covering a side surface of the element body.

8. The multilayer ceramic electronic component according to claim 5, wherein the glass component includes 20 to 60 mass % of BaO.

9. A multilayer ceramic electronic component comprising:

an element body including:

internal electrode layers and dielectric layers alternately laminated in a lamination direction, the dielectric layers having a main component of a dielectric material;

an upper surface;

a lower surface located on a side of the element body opposite the upper surface, in the lamination direction; and a reinforcement layer included in the upper surface or the lower surface, made of a material whose elasticity or linear thermal expansion coefficient is lower than that of the dielectric layers, and comprised of a glass component including 30 to 70 mass % of $SiO_2$, an outer surface of the reinforcement layer defining the upper surface or the lower surface, an inner surface of the reinforcement layer defining a boundary to one of the dielectric layers; and a terminal electrode disposed on an outer surface of the element body to be contacted and connected with the internal electrode layers, the terminal electrode being not substantially disposed on the upper surface of the element body or the lower surface of the element body, the terminal electrode including:

an end-side electrode part covering a leading end of the element body where the internal electrode layers are led, wherein a thickness of the multilayer ceramic electronic component is less than 100 μm.

10. The multilayer ceramic electronic component according to claim 9, wherein the glass component includes 20 to 60 mass % of BaO.

* * * * *